Sept. 18, 1962 K. M. CHIRGWIN ET AL 3,054,940
HIGH FREQUENCY POWER SUPPLY
Filed Oct. 21, 1959 3 Sheets-Sheet 1

INVENTOR.
KEITH M. CHIRGWIN &
LAWRENCE J. STRATTON
BY Bosworth, Sessions,
Herrstrom & Knowles
ATTORNEYS

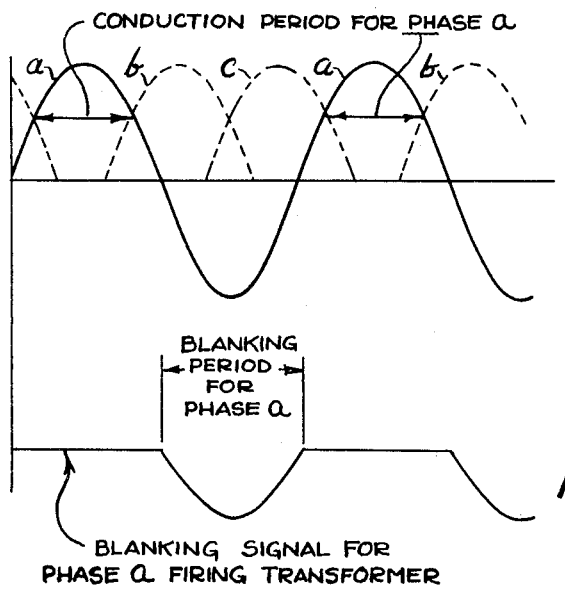
Fig. 2A
Fig. 2B
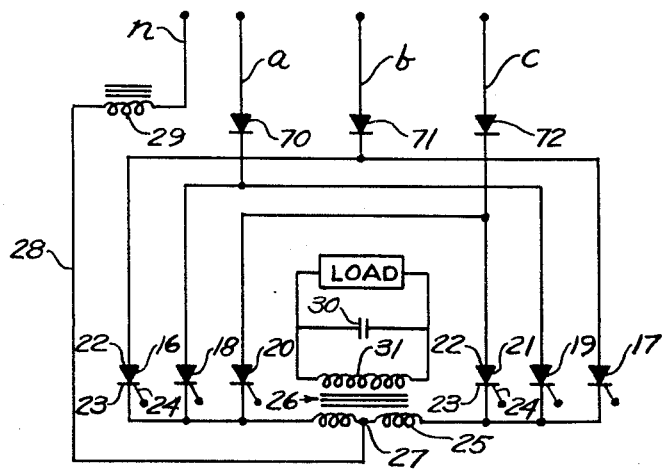
Fig. 3

3,054,940
HIGH FREQUENCY POWER SUPPLY
Keith M. Chirgwin, Bedford, and Lawrence J. Stratton, Lyndhurst, Ohio, assignors, by mesne assignments, to The Siegler Corporation, Los Angeles, Calif., a corporation of Delaware
Filed Oct. 21, 1959, Ser. No. 847,771
4 Claims. (Cl. 321—69)

This invention relates to frequency changers and more particularly to static frequency changers that are adapted to convert a relatively low frequency three-phase power input into a single-phase high frequency power output.

Single-phase high frequency power is required for various purposes in aircraft and in commercial, industrial and laboratory installations.

Heretofore, in some installations high frequency power has been supplied by inverters having D.C. inputs. In the usual case there is no suitable D.C. source available and devices that contain both a rectifier and an inverter are employed. The rectifier rectifies the alternating current input and the inverter then converts the D.C. into alternating current of the desired frequency. Other installations have employed oscillator-controlled audio frequency amplifiers as high frequency power sources. These devices embody transistors or vacuum tubes, are bulky and heavy and are inherently inefficient because the transistors or vacuum tubes cannot be operated in the switching mode in a conventional amplifier.

In the present invention, low frequency alternating current is converted directly to high frequency alternating current by means of solid state switching devices such as controlled rectifiers without requiring a D.C. link. This gives important advantages over a conventional rectifier and static inverter power supply in that it is a single conversion device and hence inherently more efficient. Furthermore, a failure of the static components to commutate does not constitute a short circuit on the supply since the short circuit can persist only until the next zero voltage of the input supply frequency. Also, frequency changers made according to the present invention are smaller and lighter for a given power output and inherently more efficient than oscillator-amplifier combinations.

The general object of the invention is the provision of a static frequency changer adapted to convert relatively low frequency alternating current directly into high frequency alternating current with a high degree of efficiency; another object is to provide such a frequency changer that is made up of reliable, lightweight and efficient solid-state components. Other objects are the provision of frequency changers that can be utilized without requiring input transformers and the provision of frequency changers embodying controlled rectifiers in which full utilization can be made of the forward voltage rating of the controlled rectifiers.

Other objects and advantages of the invention will become apparent from the following description of a preferred form thereof, reference being made to the accompanying drawings, in which:

FIGURES 2A and 2B are wave diagrams illustrating aspects of the operation of the circuit;

FIGURE 3 is a circuit diagram showing a modified form of frequency changer adapted for use with a three-phase, four-wire system.

Figure 1:
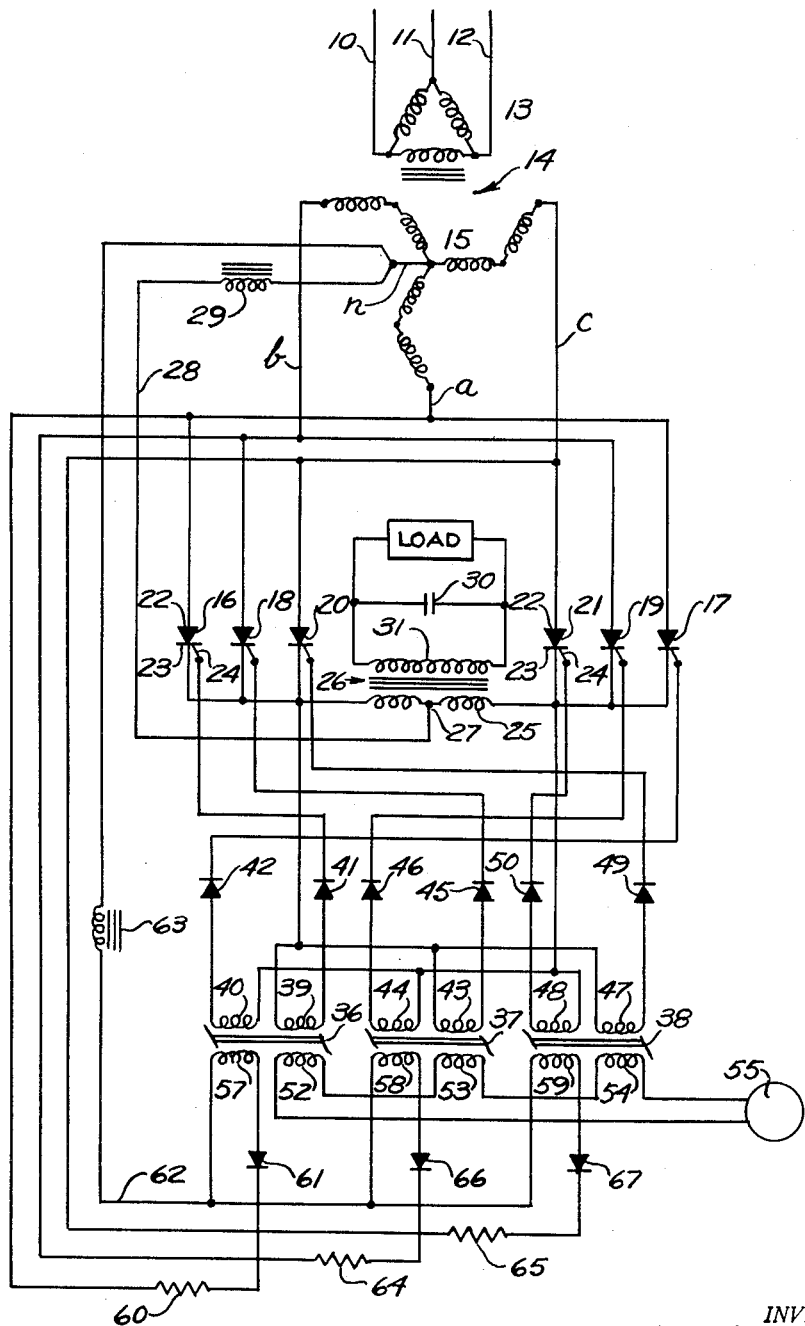
FIGURE 1 is a circuit diagram of a preferred form of frequency changer embodying our invention.

Referring to FIGURE 1 of the drawings, the input is shown as a three-phase system embodying supply lines 10, 11 and 12 which are connected to the primary 13 of an input transformer 14. The transformer 14 has a secondary 15, which is Y-connected in order to provide a neutral point. The output phases of the input transformer are shown at $a$, $b$ and $c$ and the neutral at $n$. As indicated in the drawing, zig-zag windings are preferably employed in the transformer secondary for the reason that, as appears below, the flow of current in the secondary windings of the transformer is always in the same direction and the zig-zag windings prevent saturation of the transformer core.

The high frequency output is obtained by utilizing three pairs of electronic switching devices that preferably take the form of silicon controlled rectifiers, one pair for each phase of the transformer secondary. The controlled rectifiers are PNPN semi-conductors each having a gate, an anode and a cathode. The rectifiers are normally non-conducting. Avalanche breakdown of the center junction is achieved by applying a signal to the gate, a very brief current pulse of 10 milliamperes at 1½ volts gate-to-cathode being sufficient. The amplitude of the current pulses is not critcial, so long as it is sufficient to fire the rectifier. Breakdown occurs at speeds that are almost instantaneous; after breakdown the voltage across the rectifiers is very low. A small amount of power applied at the gate makes it possible to control the switching action of the rectifiers at very high rates of speed. A rectifier is fired by applying an appropriate current pulse to the gate when the anode-to-cathode voltage is positive; the rectifier then becomes conductive and continues to conduct until the forward voltage is removed or until a negative pulse of sufficient duration and magnitude to stop conduction is applied to the anode.

Controlled rectifiers 16 and 17 constitute the pair connected to phase $a$; rectifiers 18 and 19 are connected to phase $b$; and rectifiers 20 and 21 are connected to phase $c$. The anodes, cathodes and gates of the rectifiers are indicated by reference characters 22, 23 and 24 respectively. It will be noted that in the circuit shown in FIGURE 1 the anodes of all of the rectifiers are connected to the output phases of the transformer; the cathodes of rectifiers 16, 18 and 20 are connected in parallel to one end of the center tapped primary 25 of output transformer 26 while the cathodes of rectifiers 17, 19 and 21 are connected in parallel to the other end of the primary 25 of transformer 26. The return connection to the neutral $n$ is from the center tap 27 through conductor 28 and a smoothing choke 29. Obviously, the connections of the rectifiers could be reversed, but all of the rectifiers must be connected to conduct in the same direction. As mentioned above, with this circuit the flow of current in the windings of the secondary 15 of the input transformer is always in the same direction, hence the desirability of employing zig-zag windings.

A commutating condenser 30 is connected across the secondary 31 of the output transformer 26 and the load to be supplied by the frequency changer is also connected across the secondary 31 as shown. Alternatively the commutating condenser can be connected across the outer ends of the center tapped primary 25 of the transformer 26.

The voltages of input phases $a$, $b$ and $c$ appearing on the anodes of the controlled rectifiers are shown in FIGURE 2A. Curve $a$ indicates the anode voltage on rectifiers 16 and 17; curve $b$, the positive half cycles of voltage on rectifiers 18 and 19; and curve $c$, the positive half cycles of voltage on rectifiers 20 and 21. According to the present invention the rectifiers in the pair associated with each phase are made to conduct alternately at the desired frequency during the period when the instantaneous voltage of the phase with which the rectifiers are associated exceeds the voltage of the other two phases. The conduction period for each phase is about 120°, extending from one natural point of commutation to another and the conduction period for phase *a* is shown on FIGURE 2A.

The controlled rectifiers are fired at the proper times by firing pulses that are preferably supplied by saturable pulse transformers 36, 37 and 38 which are arranged to fire rectifiers 16 and 17; 18 and 19; and 20 and 21 respectively. These transformers are devices having cores of square loop material that are in either a state of negative saturation or positive saturation and produce output pulses whenever the cores go from one state of saturation to the other. Transformer 36 has output windings 39 and 40 connected to the gate-cathode circuits of controlled rectifiers 16 and 17, respectively, through rectifiers 41 and 42; transformer 37 has output windings 43 and 44 connected to the gate-cathode circuits of controlled rectifiers 18 and 19, respectively, through rectifiers 45 and 46; and transformer 38 has output windings 47 and 48 connected to the gate-cathode circuits of rectifiers 20 and 21, respectively, through rectifiers 49 and 50. The rectifiers 41, 42, 45, 46, 49 and 50 insure that only positive pulses will be applied to the respective gates. The input to the pulse transformers 36, 37, and 38 is provided by means of input windings 52, 53 and 54, respectively. These windings are preferably all connected in series and all supplied with a control or signal current of the desired output frequency by means of a high frequency current source 55. The current source 55 may be of any conventional type such as a tuning fork controlled oscillator and a power amplifier, or a transistor oscillator and a power amplifier.

The current flowing through the input windings 52, 53 and 54 causes the cores of transformers 36, 37 and 38 to go from one state of saturation to the other twice during each cycle of the high frequency input. Considering transformer 36 and output windings 39 and 40, it is to be noted that diodes 41 and 42 are connected at opposite ends of the windings 39 and 40, and the windings are wound in the same direction on the core. With this arrangement the controlled rectifiers 16 and 17 are fired alternately. Assume, for example, that when the core of transformer 36 goes from a state of negative saturation to a state of positive saturation, a positive firing impulse is generated in output winding 39; this pulse is transmitted by diode 41 and fires controlled rectifier 16. At the same instant, a voltage in the same direction is generated in output winding 40 but this voltage is blocked by diode 42 so that no firing pulse is supplied to the gate of controlled rectifier 17. When the state of saturation of core 36 changes from positive to negative at the end of the succeeding half cycle, the voltage generated in output winding 40 fires controlled rectifier 17 while diode 41 blocks and prevents the firing of controlled rectifier 16. Commutation between the controlled rectifiers of the pair is accomplished by means of the commutating capacitor 30; the condenser supplies negative pulses to turn off a conducting rectifier of a pair when the other rectifier of the pair is fired.

As explained above, the rectifiers 16 and 17 fire during the conduction period indicated on curve *a* of FIGURE 2A. When the voltage of phase *a* becomes less positive than the voltage of phase *b*, to which controlled rectifiers 18 and 19 are connected, rectifiers 16 and 17 are blocked and rectifiers 18 and 19 begin to fire. After the conduction period shown on curve *b* is ended 120° later, rectifiers 20 and 21 begin to fire for 120° when rectifiers 16 and 17 again take over. The operation of the output windings and diodes associated with transformers 37 and 38 is just as described in connection with transformer 36. In operation of the system, the rectifiers in a pair fire alternately, each producing one-half cycle of the output voltage; the pairs fire successively, and the frequency of the output voltage is precisely the same as frequency of the signal current in input windings 52, 53 and 54.

From the foregoing, it will be evident that instead of employing three firing transformers as shown a single firing transformer having a single input winding and as many output windings as there are controlled rectifiers could be employed. However, we prefer to employ the arrangement shown in FIGURE 1 of the drawing, with separate transformers and with additional windings 57, 58 and 59 respectively, on the cores of each transformer. Without these windings, or if a single transformer were employed, firing impulses would be supplied alternately to the controlled rectifiers in each pair at all times. While the frequency changer would operate satisfactorily under that condition and each succeeding pair of rectifiers would take over the conduction of the high frequency current from a preceding pair as the input voltage of the succeeding pair became more positive, the supplying of firing signals to the controlled rectifiers when their anode-to-cathode voltages were negative, would have the effect of increasing the inverse leakage of the rectifiers; this is undesirable because of the heat generated in the rectifiers and because of a reduction in efficiency.

In order to avoid these undesirable effects the "blanking" windings 57, 58 and 59 are provided to suppress the firing impulses that would otherwise be received by the controlled rectifiers the major portion of the time when they are not firing. This is accomplished by connecting the blanking windings across the secondary-to-neutral of the input transformer phases with which the controlled rectifiers are connected. Considering controlled rectifiers 16 and 17 and pulse transformer 36 the blanking winding 57 is connected to phase *a* through a resistor 60 and a diode rectifier 61. The return circuit is to neutral *n* through the conductor 62 and a small choke 63. The provision of the resistor 60 makes the connection between input transformer phase *a* and neutral a current source and the diode 61 permits current to flow through the blanking winding 57 only through the 180° of the cycle in which the voltage applied to the anodes of controlled rectifiers 16 and 17 is negative; i.e., throughout the negative half cycle of applied voltage. So long as current is flowing through blanking winding 57 the core of transformer 36 is held in a state of saturation because the number of ampere turns supplied by the blanking winding is greater than the ampere turns supplied by the input winding 39 (it makes no difference whether this is negative or positive saturation) and so long as the core is saturated no firing pulses can be generated in the windings 39 and 40.

The period in the cycle during which the blanking winding 57 for transformer 36 is energized is shown in FIGURE 2B. It will be seen that current flows through the blanking winding during the 180° that the voltage of phase *a* is negative. The rectifiers 16 and 17 do not conduct for approximately 240° and thus there are periods of about 30° at each end of the non-conducting period when the rectifiers receive firing signals. However, the elimination of the firing signals for 180° of each cycle is satisfactory from the standpoints of eliminating heating and increasing efficiency, and the continuation of the firing signals 30° after a conduction period ends and the initiation of the signals 30° before a conduction period begins insures that each pair of controlled rectifiers will take over the firing function from the preceding pair in normal manner even though there may be considerable overlap of the conduction periods.

The operation of the circuits associated with transformers 37 and 38 is identical with that just described. There are resistances 64 and 65 and diodes 66 and 67 in series with the blanking windings 58 and 59 respectively. The circuits to neutral are all through conductor 62 and choke 63. The choke 63 absorbs the pulses that otherwise would be produced in the blanking windings due to the high frequency input to the winding 52.

FIGURE 3 of the drawing illustrates an adaptation of the invention to a three-phase, four-wire supply, such as is normally employed in aircraft alternating current systems. Such systems ordinarily are 115/200 volt three-phase, four-wire systems. This gives a phase-to-neutral voltage of 115 volts. At the present time, controlled rectifiers are rated with identical forward and inverse voltage ratings. Oscillograms of the anode-cathode voltages on the rectifiers in a frequency changer of the type disclosed herein show that the inverse voltage is about 50% greater than the forward blocking voltage; this increase is due to action of the commutating capacitor. Thus, with a circuit such as shown in FIGURE 1 of the drawings, the voltage which can be safely fed to the controlled rectifier group is limited by the inverse rating and the forward voltage is only about two-thirds of the forward voltage rating of the rectifiers. In the system shown in FIGURE 1 the input transformer can be designed to bring the forward voltage down to a safe value.

In order to eliminate the need for an input transformer in four-wire systems and in effect to increase the rated voltage of the controlled rectifiers, we employ a circuit such as shown in FIGURE 3. In this modification the controlled rectifiers, the firing circuits, the output transformer and the load circuit are all identical with those described in connection with FIGURE 1 and corresponding elements have been given the same reference numerals. However, in this form of the invention phases *a*, *b* and *c* of a three-phase, four-wire supply are connected through series rectifiers 70, 71 and 72 directly to the anodes of controlled rectifiers 16 and 17, 18 and 19, and 20 and 21, respectively, the center tap of the primary 27 of output transformer 26 being connected directly to the neutral *n* through the smoothing choke 29. With this arrangement, the inverse voltage that ordinarily would be applied to the controlled rectifiers is reduced by the diode rectifiers 70, 71 and 72, the total voltage between supply phases *a*, *b* and *c* and the cathode circuits of the controlled rectifiers being shared by the controlled rectifiers and the diode rectifiers 70, 71 and 72. Thus, this circuit makes it possible safely to increase the voltage fed to the series connected diode rectifiers and controlled rectifiers to a value such that the forward blocking voltage of the controlled rectifiers, rather than the inverse voltage, becomes the limiting factor. Studies indicate that by including diode rectifiers as shown approximately 50% increase in voltage and power output and in some circumstances as much as 67% increase in voltage and power output can be obtained with controlled rectifiers of a given rating. At the present state of development of controlled rectifiers, this makes it possible to connect a frequency changer embodying our invention directly to a three-phase, four-wire, 115/200 volt aircraft power system without requiring the rather heavy and bulky input transformer that would otherwise be necessary.

It is to be noted that the diode rectifiers shown in FIGURE 3 could also be incorporated in the circuit of FIGURE 1, but ordinarily they are not necessary in such a circuit because the voltage input to the controlled rectifiers can be limited by the input transformer 15. It is also to be noted that instead of using one diode rectifier for each pair of controlled rectifiers, a diode can be connected in series with each controlled rectifier. This, however, would require the use of six diodes instead of three in a three-phase system.

Figure 4:
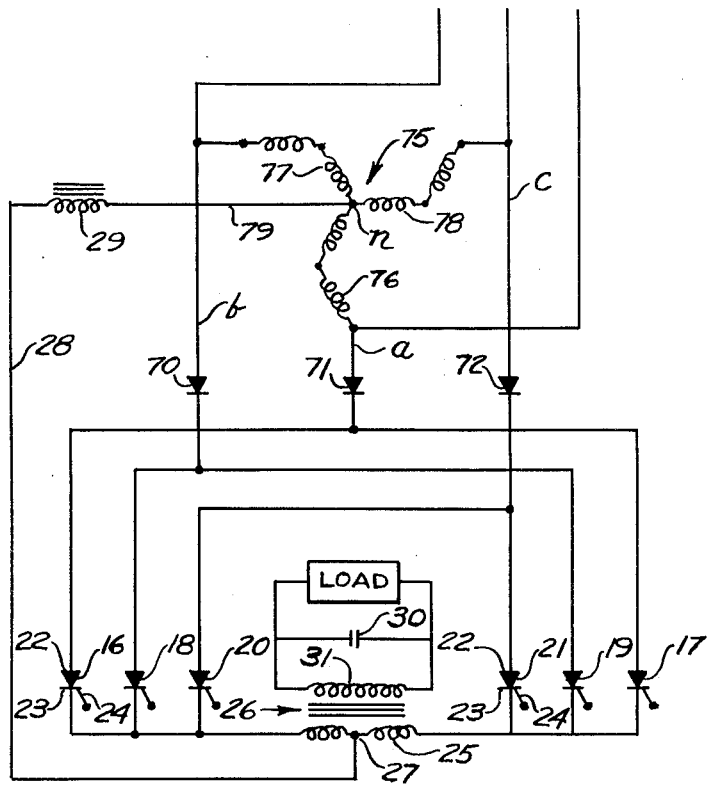
FIGURE 4 is a circuit diagram of a further modification adapted for use with a three-phase three-wire supply.

FIGURE 4 illustrates an adaptation of the frequency changer of our invention to a three-phase, three-wire supply. In this form of the invention the circuits to the controlled rectifiers, including the diode rectifiers 70, 71 and 72, are identical with those described with reference to FIGURES 1 and 3. However, a zig-zag choke 75 having pairs of phase windings 76, 77 and 78 for phases *a*, *b* and *c*, respectively, is employed to provide a neutral *n* that is connected to the smoothing choke 29. The purpose of the choke is to provide a neutral connection for the center point of the output transformer 26. The choke is in zig-zag form because the flow of current between neutral and the phase terminals of each winding is always in the same direction and the zig-zag windings prevent saturation of the core of the choke. This form of the invention is useful in connection with three-phase three-wire power supply of 115/200 volts. The series rectifiers make it possible to utilize controlled rectifiers of normal ratings with systems of voltage ranges such as are ordinarily found in industrial installations. The zigzag choke 75 is less expensive and lighter than the input transformer that is shown in FIGURE 1. Where the system voltage is of the proper value it may be possible to eliminate the series rectifiers 70, 71 and 72 in an installation of this type.

Various changes in the preferred forms of the invention described herein will be apparent to those skilled in the art. It is to be understood, therefore, that the preferred forms disclosed herein are given merely by way of example and that the scope of the invention is defined by the appended claims.

We claim:

1. A frequency changer for converting a relatively low frequency polyphase power input into a single phase high frequency power output comprising means for providing a polyphase input circuit having a plurality of input phases and a neutral, an output transformer having one center-tapped primary and a secondary adapted to be connected to a load, a pair of silicon controlled rectifiers connected between each phase of said input means and said output transformer, each rectifier having an anode, a cathode and a gate, all of the rectifiers being connected to conduct in the same direction with respect to said input means, one controlled rectifier of each pair being connected to one end of said primary, the other controlled rectifier of each pair being connected to the other end of said primary, a communicating condenser connected across one of the windings of said output transformer, and circuit means for alternately supplying current pulses at the desired output frequency to the gates of the controlled rectifiers in each pair during the period when the instantaneous voltage of the phase with which the supplied pair of controlled rectifiers is associated exceeds the instantaneous voltage of all other input phases, said circuit means comprising a saturable pulse transformer associated with each pair of controlled rectifiers, each transformer having a core of square loop material, an input winding on each core, means for supplying said input windings with a signal current of the desired output frequency, each core having two output windings, one being connected to the gate-cathode circuit of one of the controlled rectifiers of a pair and the other being connected to the gate-cathode circuit of the other controlled rectifier of the pair a diode rectifier in each gate circuit whereby positive current pulses are supplied alternately to said gates at the desired output frequency, and a blanking winding on each core energized from the input phase connected to the pair of controlled rectifiers with which the core is associated for holding its associated core in a state of saturation during a substantial part of that portion of the input cycle during which the controlled rectifiers in the pairs other than the pair associated with the particular core are conducting.

2. A frequency changer for converting relatively low frequency power of a polyphase system having a neutral into a single phase high frequency power output comprising an output transformer having one center-tapped primary and a secondary, the center tap of said primary being connected to the neutral of said system, a pair of controlled rectifiers directly connected between each phase of a polyphase system and said output transformer, all of the devices being connected to conduct in the same direction with respect to said polyphase system, one controlled rectifier of each pair being connected to one end of said primary, the other controlled rectifier of each pair being connected to the other end of said primary, a diode rectifier connected in series with and for conduction in the same direction as each pair of controlled rectifiers for reducing the inverse voltage thereon, the secondary of said output transformer being adapted to be connected to a load, a commutating condenser connected across one of the windings of said output transformer, and circuit means for alternately firing the controlled rectifiers in each pair at the desired output frequency during the period when the instantaneous voltage of the phase with which the controlled rectifier pair is associated exceeds the instantaneous voltage of all other phases of the polyphase system.

3. A frequency changer for converting relatively low frequency polyphase power of a polyphase system having a neutral into a single phase high frequency power output comprising an output transformer having one center-tapped primary and a secondary adapted to be connected to a load, the center tap of said primary being connected to the neutral of said system, a pair of silicon controlled rectifiers directly connected between each phase of a polyphase system and said output transformer, each rectifier having an anode, a cathode and a gate, all of the rectifiers being connected to conduct in the same direction with respect to said polyphase system, one controlled rectifier of each pair being connected to one end of said primary, a diode rectifier connected in series with each pair of controlled rectifiers for reducing the inverse voltage thereon, the other controlled rectifier of each pair being connected to the other end of said primary, a commutating condenser connected across one of the windings of said output transformer, and circuit means for alternately supplying current pulses at the desired output frequency to the gates of the controlled rectifiers in each pair during the period when the instantaneous voltage of the phase with which the supplied pair of controlled rectifiers is associated exceeds the instantaneous voltage of all other input phases, said circuit means comprising a saturable pulse transformer associated with each pair of controlled rectifiers, each transformer having a core of square loop material, an input winding on each core, means for supplying said input windings with a signal current of the desired output frequency, each core having two output windings, one being connected to the gate cathode circuit of one of the controlled rectifiers of a pair and the other being connected to the gate cathode circuit of the other controlled rectifier of the pair, a diode rectifier in each gate circuit whereby positive current pulses are supplied alternately to said gates at the desired output frequency, and a blanking winding on each core energized from the input phase connected to the pair of controlled rectifiers with which the core is associated for holding its associated core in a state of saturation during a substantial part of that portion of the input cycle during which the controlled rectifiers in the pairs other than the pair associated with the particular core are conducting.

4. A frequency changer for converting a relatively low frequency polyphase power input into a single phase high frequency power output comprising means for providing a polyphase input circuit having a plurality of input phases and a neutral, an output transformer having one center-tapped primary and a secondary adapted to be connected to a load, a pair of silicon controlled rectifiers connected between each phase of said input means and said output transformer, each rectifier having an anode, a cathode and a gate, all of the rectifiers being connected to conduct in the same direction with respect to said input means, one controlled rectifier of each pair being connected to one end of said primary, the other controlled rectifier of each pair being connected to the other end of said primary, a commutating condenser connected across one of the windings of said output transformer, and circuit means for alternately supplying current pulses at the desired output frequency to the gates of the controlled rectifiers in each pair during the period when the instantaneous voltage of the phase with which the supplied pair of controlled rectifiers is associated exceeds the instantaneous voltage of all other input phases, said circuit means comprising a saturable pulse transformer associated with each pair of controlled rectifiers, each transformer having a core of square loop material, an input winding on each core, means for supplying said input windings with a signal current of the desired output frequency, each core having two output windings, one being connected to the gate-cathode circuit of one of the controlled rectifiers of a pair and the other being connected to the gate-cathode circuit of the other controlled rectifier of the pair, a diode rectifier in each gate circuit whereby positive current pulses are supplied alternately to said gates at the desired output frequency, and a blanking winding on each core connected in series with a diode rectifier to the input phase connected to the pair of controlled rectifiers with which the core is associated for biasing its associated core to a state of saturation and preventing the flow of output current pulses from the output windings associated therewith during one half cycle of voltage applied to its associated pair of controlled rectifiers and for permitting the flow of output current pulses from the output windings associated therewith during the other half cycle of voltage applied to its associated pair of controlled rectifiers.

References Cited in the file of this patent

UNITED STATES PATENTS

| 2,106,826 | Bosch | Feb. 1, 1938 |
| 2,674,714 | Smart et al. | Apr. 6, 1954 |
| 2,910,641 | Boyer | Oct. 27, 1959 |
| 2,953,735 | Schmidt | Sept. 20, 1960 |

OTHER REFERENCES

"Peaking and Interphase Transformers for Thyratron Control," by Chin and Moyer in Electrical Manufacturing, May 1956.